No. 848,878. PATENTED APR. 2, 1907.
N. C. BOLIN.
COTTON THINNER.
APPLICATION FILED JUNE 13, 1906.
2 SHEETS—SHEET 1.
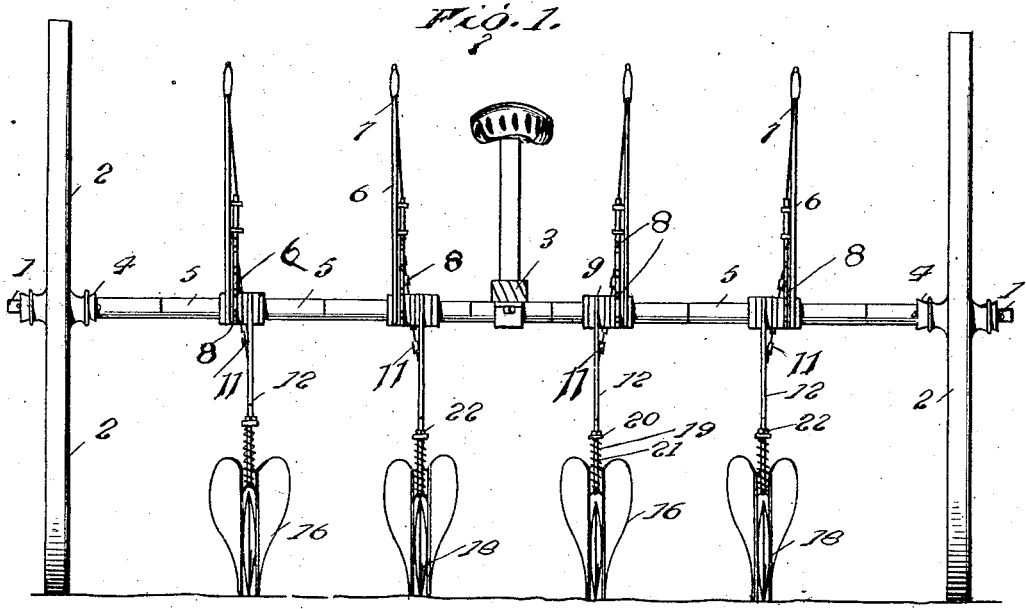
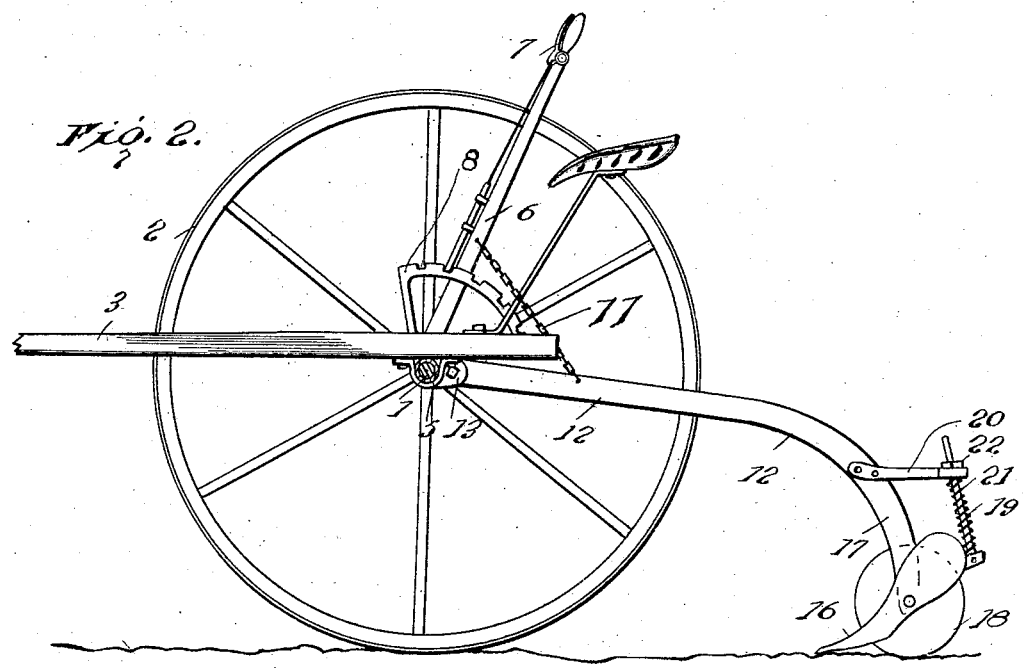
Witnesses
J. H. Johnston
W. N. Woodson
Inventor
N. C. Bolin
By R. H. A. Bracey, Attorneys

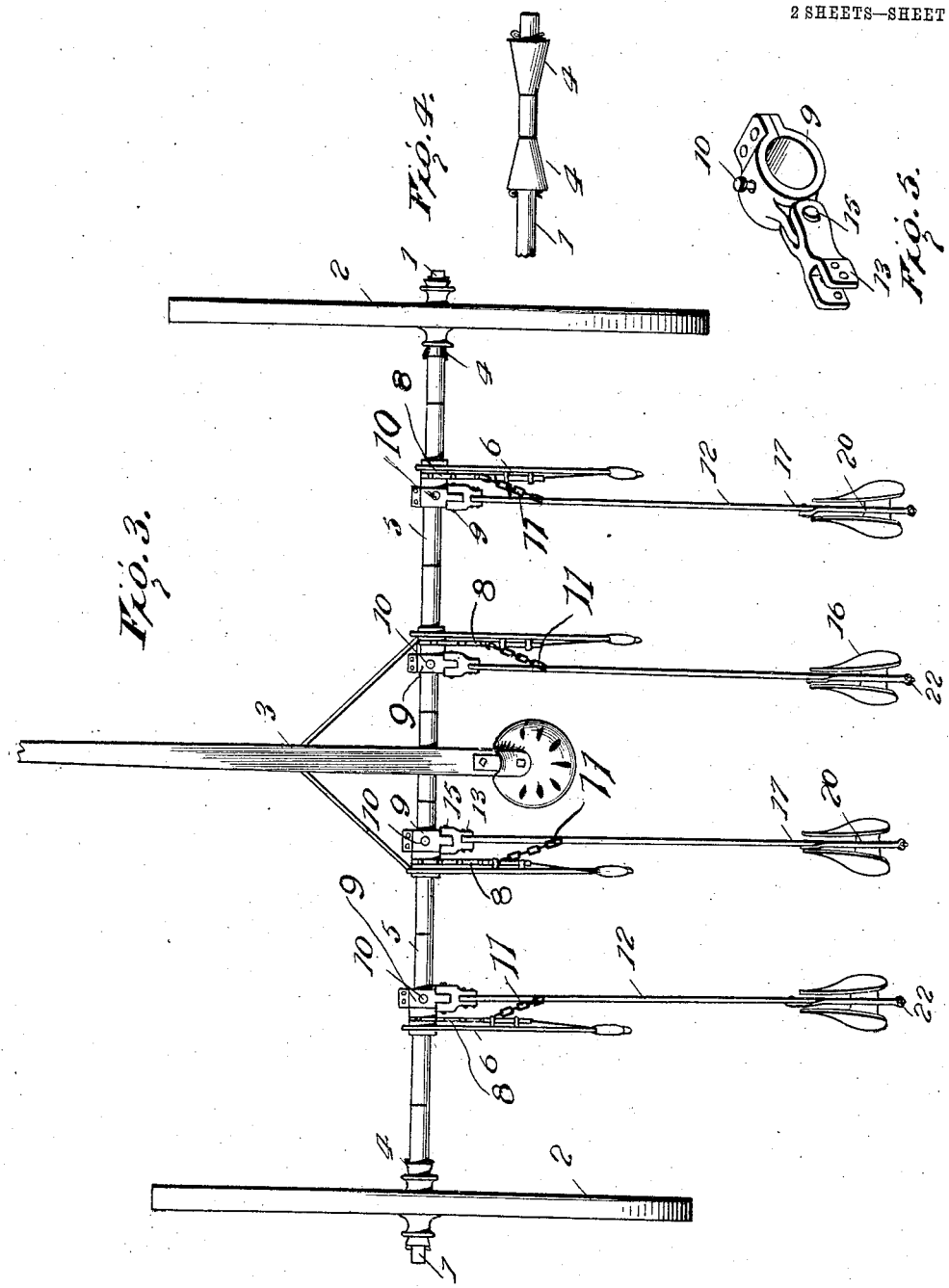

UNITED STATES PATENT OFFICE.

NATHAN C. BOLIN, OF DECKER, TEXAS.

COTTON-THINNER.

No. 848,878.　　　　Specification of Letters Patent.　　　　Patented April 2, 1907.

Application filed June 13, 1906. Serial No. 321,563.

*To all whom it may concern:*

Be it known that I, NATHAN C. BOLIN, a citizen of the United States, residing at Decker, in the county of Nolan and State of Texas, have invented certain new and useful Improvements in Cotton-Thinners, of which the following is a specification.

This invention provides an implement specially designed for thinning rows of cotton or corn when the same have been sowed in drills and have acquired a plant or growth to admit of such operation being successfully performed.

The implement in its general construction is not unlike the ordinary riding-cultivator and is provided with a series of shovels spaced apart according to the required thinning, said implement being designed to be drawn crosswise of the field, so as to cut down portions of the plants and leaving those required to reach maturity.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a rear view of a machine for thinning rows of cotton, corn, and the like embodying the invention. Fig. 2 is a vertical longitudinal section thereof. Fig. 3 is a top plan view of the machine. Fig. 4 is a detail view of a portion of the axle, showing the conical washers. Fig. 5 is a detail perspective view of a cuff, showing the manner of coupling the clevis members thereto.

Corresponding and like parts are referred to in the following description and indicated in all the views of the drawings by the same reference characters.

The implement comprises an axle 1, supporting-wheels 2, a pole or tongue 3, and a gang of cultivators or plows properly spaced to effect the required thinning of the rows. The pole or tongue 3 is connected with the axle 1 in any accustomed manner and is adapted to have the draft applied thereto for drawing the implement over the field. The supporting-wheels 2 are loosely mounted upon the axle and are adjustable thereon and are confined between conical washers 4, which admit of taking up wear, so as to obviate rattle of the wheels and also provide for their adjustment.

A series of sleeves or tubes 5 are loosely mounted upon the axle, and each is provided with means to admit of its angular adjustment and for securing the same in the required position. For this purpose a lever 6 is secured to each of the sleeves and is provided with a hand-latch 7 to engage with the teeth of a segment 8, made fast to the axle, so as to hold the sleeve and cultivator or plow in the required position. A cuff 9 is mounted upon each sleeve and is adjustable thereon and is adapted to be secured in the located position by means of a set-screw 10, threaded into an opening thereof. The adjustment of the cuff upon the sleeve provides for varying the distance between the shovels, sweeps, or plow-points. The lever 6 may be connected to the coöperating plow-beam in any manner, and for this purpose a chain 11 is illustrated.

A beam 12 is coupled to each cuff so as to move in a vertical plane and is provided at its front end with clevis members 13, secured to opposite sides, and have their front ends embracing rear extensions or lugs of the cuffs, the overlapping parts being transversely apertured in coincident relation to receive a pivot-pin 15, upon which the beam is adapted to swing vertically. A pair of shovels or sweeps 16 are connected to the stock of the beam 12 and are transversely spaced to receive between them a rolling colter 18, which is designed to cut trash, roots, and the like and to steady the shovels and prevent lateral movement thereof when the implement is in operation. The shovels or sweeps 16 preferably have pivotal connection with the stock 17 so as to yield in the event of meeting with an unyielding obstruction or with a resistance which would tend to disable the implement. A tension-spring 19 connects the shovels with a trace 20, the latter being secured at its upper forward end to the stock 17 and having an eye at its rear end to receive a rod 21, upon which the tension-spring 19 is mounted, a set-nut 22 being threaded upon the upper end of the rod 21 to admit of regulating the tension of the spring 19 so as to hold the shovels or sweeps to the work with a greater or less force.

Cotton or corn planted in rows is adapted to be thinned by a machine constructed in accordance with this invention by drawing the implement across the field transversely of the rows of plants. The distance between the plants to be left standing may be regulated by relative lateral adjustment of the beams, which is effected by shifting of the cuffs 9 upon the sleeves or tubes 5. The shovels may be thrown out of action by proper manipulation of the levers 6, and in the event of the shovels meeting with abnormal resistance the springs 19 will yield and permit said shovels to ride over the obstructions, as will be readily comprehended.

The object of the rolling colter is to ride over any obstruction, lifting the sweep over same in unison with colter.

Having thus described the invention, what is claimed as new is—

1. In an implement of the character described, the combination of an axle, sleeves mounted upon said axle to turn freely thereon, plow-beams having adjustable connection with said sleeves, toothed segments fast to the axle, and levers fast to the respective sleeves and provided with means for coöperating with the toothed segments to hold the plow-beams in an adjusted position, and connecting means between the beams and said levers.

2. In an implement of the character specified, the combination of an axle, sleeves mounted upon the axle to turn freely thereon, an operating-lever fastened to each sleeve, interlocking means between the levers and axle to secure the sleeves at any required angular adjustment, a plow-beam mounted upon each sleeve and having independent pivotal movement, and connecting means between the several plow-beams and the respective operating-levers.

3. In an implement of the character set forth, the combination of an axle, a series of sleeves mounted upon said axle, a lever fastened to each sleeve, a toothed segment connecting with the axle in coöperative relation with each operating-lever, a hand-latch appiled to each lever for coöperation with the respective segments to secure the operating-levers and sleeves in the required adjusted position, a cuff adjustable upon the sleeves both angularly and longitudinally, a plow-beam having pivotal connection with each cuff, and a flexible connection between each plow-beam and the respective operating-lever.

In testimony whereof I affix my signature in presence of two witnesses.

NATHAN C. BOLIN. [L. S.]

Witnesses:
 GEORGE W. COCHRAN,
 JOHN C. HARRIS.